Jan. 9, 1940.　　　　　C. R. HANNA　　　　　2,186,243
REGULATOR
Filed Aug. 25, 1938　　　　　2 Sheets-Sheet 1
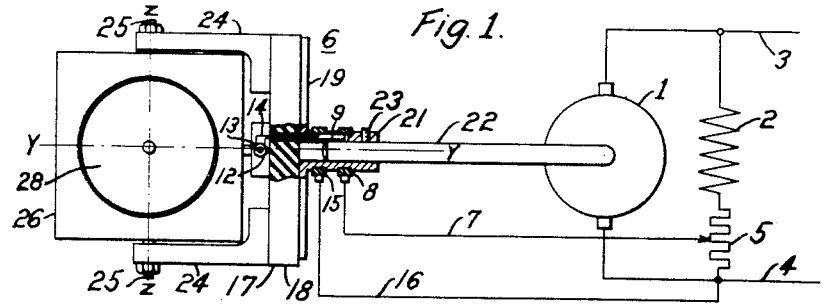
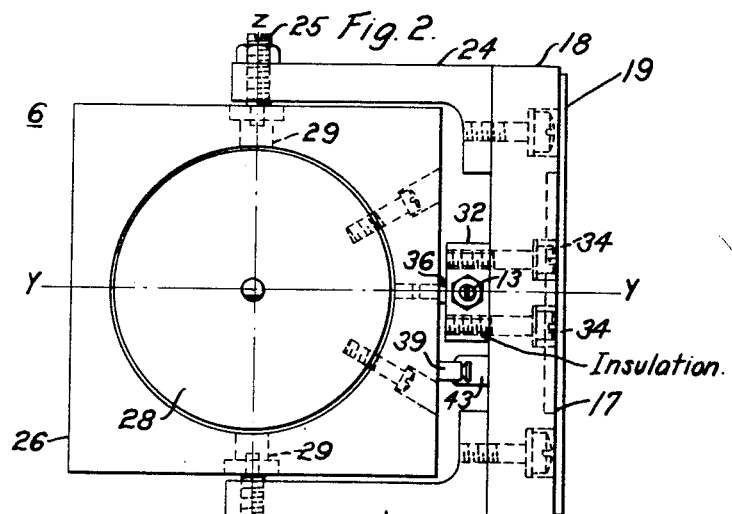
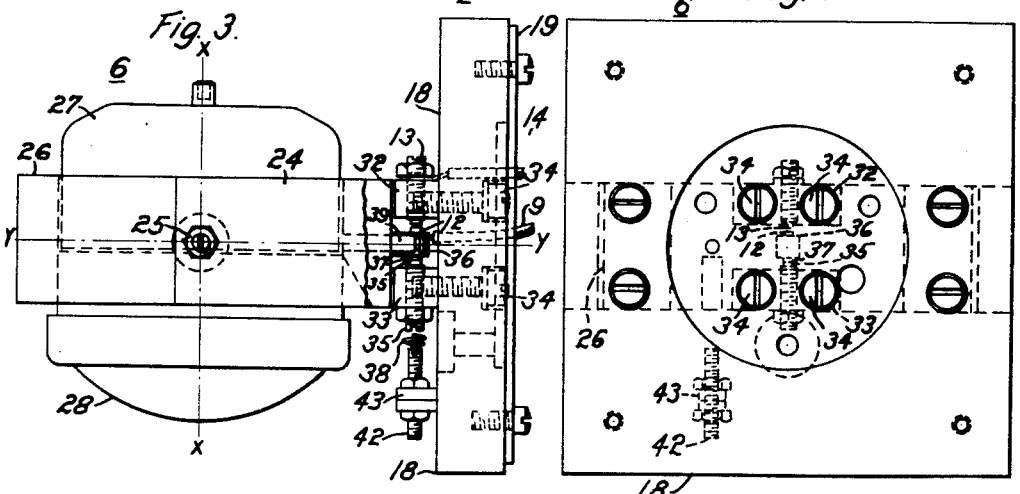
WITNESSES:　　　　　　　　　　　　　　INVENTOR
Wm. B. Sellers.　　　　　　　　　　　Clinton R. Hanna.
F. E. Hardy　　　　　　　　　　　　　Ezra D. Savage
　　　　　　　　　　　　　　　　　　　　ATTORNEY Jan. 9, 1940.　　　　C. R. HANNA　　　　2,186,243
REGULATOR
Filed Aug. 25, 1938　　　　2 Sheets-Sheet 2
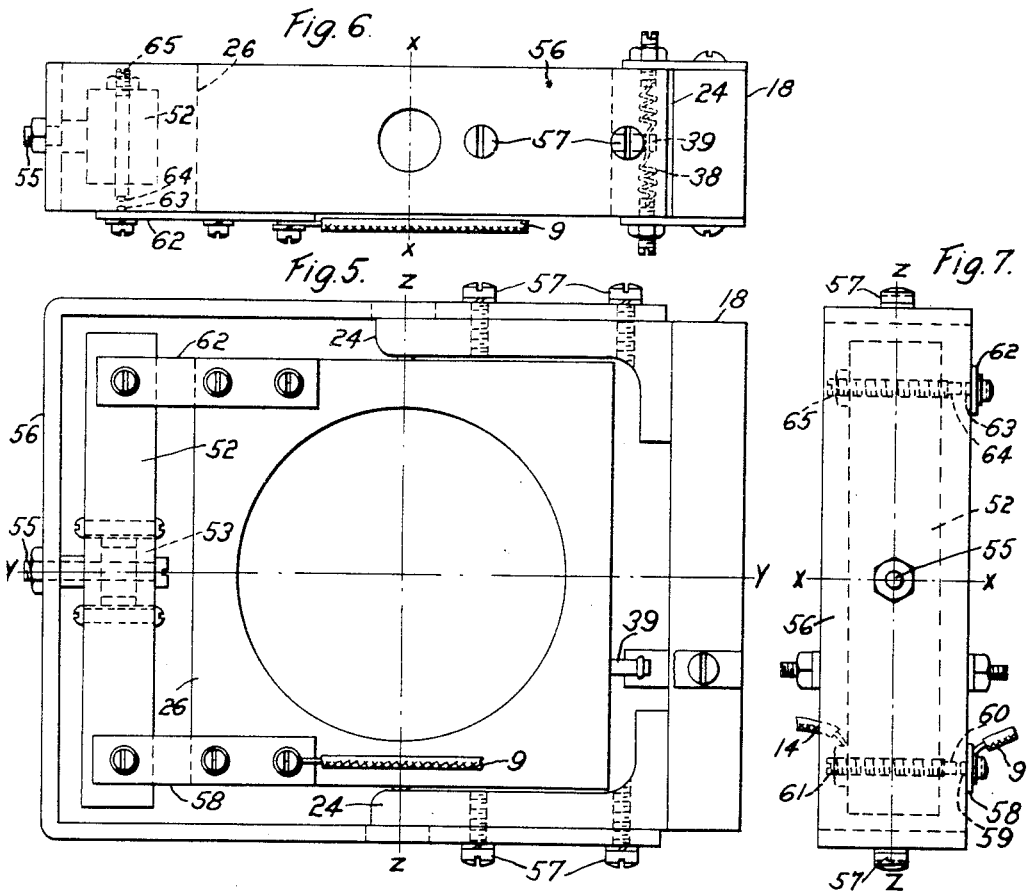
WITNESSES:
INVENTOR
Clinton R. Hanna.
BY
ATTORNEY Patented Jan. 9, 1940

2,186,243

UNITED STATES PATENT OFFICE 2,186,243

REGULATOR

Clinton R. Hanna, Wilkinsburg, Pa., assignor to Westinghouse Electric & Manufacturing Company, East Pittsburgh, Pa., a corporation of Pennsylvania Application August 25, 1938, Serial No. 226,762

9 Claims. (Cl. 175—355)

My invention relates to regulators, and particularly to regulators adapted to control the speed of rotating machines, such as electric motors.

In my copending application Serial No. 164,158, filed September 16, 1937, for Speed regulators, and assigned to the same assignee as this application, I disclosed and claimed a regulator in which a mass is mounted to be rotated about an axis at a speed that varies in accordance with variations in the value of the regulated quantity, and that is so weighted as to provide a centrifugal couple about an axis at right angles to the axis of rotation.

In certain situations, such, for example, as where the speed of a regulated device is low and the centrifugal force is, therefore, small, it is impractical to use a centrifugal device because of the necessity of gearing it to rotate at a relatively high speed with respect to the speed of the regulated member.

In accordance with the invention, I provide a sensitive and fast regulator by employing a gyroscope mounted within a rotating frame with its axis of precession at right angle to the axis about which the frame is revolved at a speed that varies in accordance with the speed of the regulated quantity. The axis of precession is also at right angle to the axis of spin of the inertia element of the gyroscope so as to produce a gyroscope couple about the axis of precession that may be used to perform the same function as a centrifugal couple about this axis. Since the gyroscopic couple is a function not only of the rate of rotation of the frame in which the gyroscope is mounted, but also is a function of the rate of spin of the rotating inertia element of the gyroscope and of the moment of inertia of this element, the gyroscope may be made very sensitive to slight changes in the speed of rotation about its main axis of rotation by employing an inertia element of sufficient moment of inertia rotated at a high constant speed about its axis of spin.

It is an object of my invention to provide a regulator employing a gyroscopic couple the force of which varies in accordance with variations in the regulated quantity for establishing a corrective influence to maintain the desired value of the regulated quantity.

It is a further object of the invention to provide a gyroscopic regulator that is responsive both to the speed of the regulated quantity and to the rate of change in speed of this quantity from the desired value.

More specifically stated, it is an object of my invention to provide a regulating equipment employing a gyroscope that is sensitive to variations in the regulated quantity and an inertia element for creating an inertia torque in response to the rate of departure of the regulated quantity from its desired value for introducing an anti-hunting or stabilizing influence into the regulating action.

Other objects and advantages of my invention will be apparent from the following description of preferred embodiments thereof, reference being made to the accompanying drawings in which:

Figure 1 is a diagrammatic view of apparatus and circuits illustrating an application of my invention for controlling the speed of an electric motor;

Fig. 2 is an enlarged side elevational view of a portion of the regulator equipment shown in Fig. 1;

Fig. 3 is a bottom view of the apparatus shown in Fig. 2;

Fig. 4 is a side view of the end plate shown in Fig. 3 with the metal base plate removed;

Fig. 5 is a side elevational view of a gyroscopic regulator supporting structure similar to that shown in Figs. 1 to 4 with the addition of an inertia element for introducing an anti-hunting influence into the regulator action;

Fig. 6 is a top plan view of the structure shown in Fig. 5 with parts shown in dotted lines; and Fig. 7 is an end view of the structure shown in Fig. 5.

Referring to the drawings, the regulated device illustrated in Fig. 1 is shown as an electric motor having an armature winding 1 and a field winding 2 that are supplied with electric energy from a circuit represented by conductors 3 and 4, a regulating resistor 5 being shown in series circuit relation with field winding 2.

A speed regulator, indicated generally at 6, is mounted to be driven in accordance with the speed of the motor to be regulated for varying the effective value of the field regulating resistor 5 through a circuit that extends from conductor 7 through slip ring 8, conductor 9, contact members 12 and 13, conductor 14, slip ring 15, and conductor 16.

The regulator 6 comprises a supporting frame 17, including an end plate 18, carried by a metal plate 19, having a sleeve 21 extending over and fastened to the motor shaft 22 by a set screw 23. Bracket arms 24 are provided that extend outwardly from the other side of end plate 18, and are provided at their outer ends with bearing studs 25 serving as pivots for the rectangular support 26.

The gyroscope structure includes an inertia element 27, best shown in Fig. 3, comprising the rotating part of a motor, the remaining portion of which is enclosed within the housing 28. This element rotates rapidly about an axis of spin X—X, which axis is at right angles to the drawing as viewed in Figs. 1 and 2. The casing 28 is mounted within the rectangular support 26, previously described as carried by bearing pins 25. The motor for driving the inertia element 27 is supplied with energy by means of a circuit which, for the sake of simplicity, is omitted from the drawings, but which connects the motor to a suitable source of energy through slip rings on the sleeve 21 in a well known manner. Ball bearings may be provided within the body of the member 26 at 29 that cooperate with the inner ends of the bearing studs 25 to provide a pivotal mounting for the member 26. This permits the movement of the inertia element 27, together with the parts carried by the rectangular supporting member 26 about the axis of precession Z—Z, which is shown as the vertical axis in Figs. 1 and 2, and is at right angles to the drawing in Fig. 3. The axis Y—Y about which the regulator structure 6 is rotated in accordance with the value of the regulated quantity is at right angles to the axis of precession Z—Z and also to the axis of spin X—X, and is shown as the horizontal axis in Figs. 1, 2 and 3. As best shown in Figs. 3 and 4, insulating blocks 32 and 33 are mounted on the end plate 18 by means of screws 34 for carrying contact members 13 and 35, respectively, the inner end of the contact member 13 being adapted to be engaged by the movable contact member 12 carried by a pin 36 extending outwardly from the rectangular supporting member 26. On the opposite side of the pin 36 a contact member 37 is provided for engaging the inner end of the contact member 35 mounted in the block 33.

A spring 38 is provided, one end of which is attached to a pin 39 extending outwardly from the rectangular member 26, and the other end of which is carried by an adjusting screw 42 held in a support 43 mounted on the end plate 18. The spring 38 serves as a loading spring to bias the member 26 and parts carried thereby in a clockwise direction, as viewed in Fig. 3, or in a direction to separate contacts 12 and 13. The gyroscopic couple, caused by rotating the gyroscope about the axis Y—Y while the inertia element 27 is being rotated about the spin of axis X—X, overcomes the force of the loading spring 38 to bring the contact members 12 and 13 into engagement.

When the mechanism is in operation, the direction of spin of the inertia element 27 about the axis X—X is chosen such that the gyroscopic couple caused by rotating the gyroscope about the axis Y—Y creates a torque in opposition to the loading spring 38 so as to bring the contact members 12 and 13 into engagement upon some predetermined value of torque.

If, for example, the mechanism is being revolved about the axis Y—Y in a direction such that the top of the frame, as viewed in Figs. 1 and 2, is moving toward the observer and the bottom of the frame is moving away from the observer, and if the axis of spin of the inertia element 27 is in a clockwise direction, as viewed in Figs. 1 and 2, the gyroscopic couple about the axis of precession Z—Z will be in a direction to cause that side of the rectangular member 26 to the right of the axis Z—Z, as viewed in Figs. 1 and 2, to move toward the observer, moving the contact carrying pin 36 in a direction to cause engagement of the contact members 12 and 13 to close the above-traced circuit through conductors 7 and 16, short-circuiting a portion of the regulating resistor 5 to decrease the value of the regulating resistor, thus increasing the excitation of the field winding 2 and slowing down the speed of the motor 1.

The particular value of gyroscopic couple required to develop the force necessary to cause engagement of the contact members 12 and 13 may be adjusted by the screw 42, attached to one end of the loading spring 38. The effective value of the regulating resistor 5 is, therefore, varied upon variations in the average pressure between the contact members 12 and 13 in accordance with the increase or decrease in the gyroscopic couple occasioned by an increase or decrease in the rate of rotation of the regulating mechanism about the axis Y—Y. As described, it will be noted that the contact members 35 and 37 do not perform any electrical function. They do, however, perform a mechanical function in limiting the movement of the gyroscope about its axis of precession in the direction to cause separation of the contact members 12 and 13.

It will be appreciated that the force of gyroscopic couple of the inertia element 27 about the axis of precession Z—Z is dependent upon the rate of movement of the inertia element about the axis Y—Y, providing, of course, that the rate of spin of the element 27 about its axis X—X is constant. It will also be appreciated that the value of this gyroscopic couple changes more for slight speed deviations than would a centrifugal couple, upon a change in the speed of rotation about the axis Y—Y, thus making the gyroscopic regulator much more sensitive to changes in the regulated quantity than a centrifugal governor at very low regulated speeds.

Referring to Figs. 6 to 9, inclusive, the supporting frame for a gyroscopic regulator is illustrated that is similar in general construction to that disclosed in Figs. 1 to 4, but includes, in addition to the speed responsive spinning gyroscope element, an inertia element 52 mounted on ball bearings shown at 53 on a pin 55 carried by a U-shaped member 56, the inner ends of which are attached by screws 57 to the bracket members 24. The spinning inertia element 27 and motor casing 28 not shown in Figs. 5, 6 and 7 are the same as in Figs. 1 to 4. In place of the contact members 12 and 13 shown in the embodiment of the invention illustrated in Figs. 1 to 4, a leaf member 58 extends from the member 26 that supports contact member 59 and is positioned to engage a contact member 60 carried on the inner end of a bolt 61 mounted on one end of the inertia member 52. A contact member 62 is provided mounted on the supporting member 26 adjacent the opposite end of the inertia bar 52 and carries a contact member 63 that is adapted to engage a contact member 64 carried by a bolt 65. The contact members 63 and 64, like the contact members 35 and 37 of the embodiment of the invention illustrated in Figs. 1 to 4, perform no electrical function, but perform the mechanical function of limiting the amount of movement of the bar 52 with respect to the frame in which it is mounted. The change in average contact pressure between the contact members 59 and 60 can take place because of an opposite change in pressure between the contact members 63 and 64 without requiring the gyroscope to move about the axis Z—Z.

Assuming the same direction of spin of the inertia element 21 about the axis X—X, as previously assumed, and the same direction of rotation of the regulating structure about the axis Y—Y, an increase in the speed of the regulated motor will, as before, cause an increase in the gyroscopic couple about the axis of precession Z—Z in a direction to move the right-hand edge of the rectangular member 26, as viewed in Fig. 5, toward the observer, and the left-hand edge away from the observer or in a direction to cause the contact member 59 to engage the contact member 60 and complete a circuit through conductors 9 and 14, as previously described, for decreasing the effective value of the regulating resistor 5.

The average pressure between the contact members 59 and 60 will, in the embodiment of the invention illustrated in Figs. 5 and 7, depend not only upon the movement of the member 26 carrying the contact 59, but also upon the inertia member 52. For example, since the bar member 52 is free to rotate upon the ball bearings 53, within the limits permitted by the contact members 59 or 63 through which pressure is applied to drive the bar 52 about the axis Y—Y, the inertia of the bar 52 will tend to maintain it rotating about the axis of the pin 55 at a constant rate. Thus, upon an increase or decrease in the rate of rotation of the frame about the axis Y—Y, the inertia bar 52 will tend to maintain a constant rate of rotation, thus decreasing or increasing the average pressure between the contact members 59 and 60 in accordance with the acceleration or deceleration of the gyroscope about the axis Y—Y.

The contact pressure is thus determined by two components, one responsive to speed as affected by movements of the gyroscope about its axis of precession Z—Z, and the other determined by the inertia torque of angular acceleration of the member 52 about the axis Y—Y. In the normal operation of the regulator, the motor constantly varies its speed slightly within narrow limits to cause a change in the acceleration pressure between the regulating contacts 59 and 60 at a corresponding variation in the effective value of the resistor 5. As the motor accelerates, the rotation of the gyroscope supporting frame 17 about the axis Y—Y is accelerated and the effect of this acceleration is to cause the contact member 60 to increase its pressure against the contact member 59, thus increasing the average pressure between these two contact members. This decreases the effective value of the regulating resistor 5 and increases the field current to cause the motor to decrease its speed.

The movement of the contact member 59 about the axis Z—Z occasioned by the gyroscopic couple resulting from the increase in motor speed acts in the same direction to increase the average pressure between the contact members 59 and 60 to thereby decrease the effective value of the resistor 5 and increase the excitation of the field winding 2 to decrease the speed of the motor. Correspondingly, if the motor decreases its speed below the desired value, the negative acceleration of the revolving structure about the axis Y—Y causes a separation between the contact members 59 and 60 to change the effective value of the resistor 5 in the opposite direction, causing the speed of the motor to be increased.

Thus the acceleration or deceleration of the controlled motor causes an operation of the contact members 59 and 60 in anticipation of speed changes to initiate corrective actions in the motor field excitation sooner than would otherwise be the case to thereby maintain a more accurate speed and prevent hunting action of the controlled motor.

It will be appreciated that, once the corrective action has been initiated, and the resulting correction begins to be felt on the regulated motor, the component of force responsive to the inertia torque of acceleration tending to cause a different rate of rotation of the bar 52 from that of its supporting frame 17 disappears so that the total regulating force is reduced prior to a completion of the desired correction. The acceleration component, therefore, aids both in starting a corrective action in anticipation of an error in speed and in ending the corrective action in anticipation of the completion of the corrective influence. This characteristic starting operation decreases the permitted error and increases the sensitivity of the regulator, and at the same time prevents or reduces hunting action.

Many changes in the apparatus and circuits disclosed will be apparent to those skilled in the art within the spirit of my invention, and I do not wish to be limited otherwise than by the scope of the appended claims.

I claim as my invention:

1. In a speed regulator for controlling the speed of a rotating member, an inertia element constantly rotated about an axis of spin and mounted to possess a freedom of motion about two axes each at right angles to each other and to the axis of spin, means for continuously rotating said inertia member about one of said two axes at a speed that is a measure of the speed of the regulated rotating member to cause the inertia element to precess about the other of said two named axes, biasing means for urging the inertia element to resist the force of precession, a second inertia element responsive to the rate of change in the speed of the regulated rotating member and means governed jointly by the movement of the first named inertia member about its axis of precession and by movement of the second named inertia element for controlling the speed of the rotating member.

2. In a speed regulator for controlling the speed of a rotating member, an inertia element constantly rotated about an axis of spin and mounted to possess a freedom of motion about two axes each at right angles to each other and to the axis of spin, means for continuously rotating said inertia member about one of said two axes at a speed that is a measure of the speed of the regulated rotating member to cause the inertia element to precess about the other of said two named axes, biasing means for urging the inertia element to resist the force of precession, a second inertia element responsive to the rate of change in the speed of the regulated rotating member, and means including electrical contact members controlled jointly by movement of the first named inertia member about its last named axis and said second named inertia element for controlling the regulated quantity.

3. In a regulator equipment, an inertia element constantly rotated about an axis of spin and mounted to possess a freedom of motion about two axes each at right angles to each other and at right angles to the axis of spin, means for continuously rotating said inertia member about one of said two axes at a speed that is a measure of the value of the regulated quantity, to cause the inertia element to precess about the other of said two named axes, means governed by the movement of the inertia member about its last named axis for controlling the regulated quantity, a second inertia element mounted to have a degree of freedom of motion about the first named of said two axes and driven in accordance with the speed of said first named inertia member about said axis, said inertia member being responsive to movement about its axis of freedom of motion relative to said first mentioned inertia member upon acceleration or deceleration of that member about said axis, and means governed thereby for modifying the control of the regulated quantity.

4. In a speed regulator for controlling the speed of a rotating member, an inertia element constantly rotated about an axis of spin and mounted to possess a freedom of motion about two axes each at right angles to each other and to the axis of spin, means for continuously rotating said inertia member about one of said two axes at a speed that is a measure of the speed of the regulated rotating member to cause the inertia element to precess about the other of said two named axes, biasing means for urging the inertia element to resist the force of precession, means governed by the movement of the inertia member about its axis of precession for controlling the speed of the rotating member, a second inertia element mounted to have a degree of freedom of motion about the first named of said two axes and driven in accordance with the speed of said member about said axis, said inertia member being responsive to movement about its axis of freedom of motion relative to said first mentioned inertia member upon acceleration or deceleration of that member about said axis, and means governed thereby for modifying the control of the regulated quantity.

5. In a speed regulator for controlling the speed of a rotating member, an inertia element mounted in a supporting structure that is revolved at a speed that varies in accordance with the speed of the regulated rotating member, said inertia element being constantly rotated about an axis of spin at right angles to the axis of rotation of the supporting structure and mounted to possess a degree of freedom about an axis of precession at right angles to the axis of spin and at right angles to the axis of rotation of the supporting structure, biasing means for urging said inertia element about its axis of precession, said inertia element being responsive to a gyroscopic couple that acts against the urge of said biasing means and that varies in accordance with the speed of rotation of the supporting structure, a second inertia element responsive to the rate of change in the speed of the rotating structure, and means responsive to movement of said inertia element about its axis of precession and to movement of said second named inertia element about the axis of rotation of the supporting structure for controlling the speed of the rotating member.

6. In a speed regulator for controlling the speed of a rotating member, an inertia element mounted in a supporting structure that is revolved at a speed that varies in accordance with the speed of the regulated rotating member, said inertia element being constantly rotated about an axis of spin at right angles to the axis of rotation of the supporting structure and mounted to possess a degree of freedom about an axis of precession at right angles to the axis of spin and at right angles to the axis of rotation of the supporting structure, biasing means for urging said inertia element about its axis of precession, said inertia element being responsive to a gyroscopic couple that acts against the urge of said biasing means and that varies in accordance with the speed of rotation of the supporting structure, a second inertia element mounted in said supporting structure to possess a degree of freedom of motion about the axis of revolution of said supporting structure, said inertia member being responsive to movement about its axis of freedom upon acceleration or deceleration of the supporting structure, and means jointly responsive to movement of the first named inertia member about its axis of precession and to the movement of the second named inertia element about its axis of freedom for controlling the speed of the rotating member.

7. In a speed regulator for controlling the speed of a rotating member, an inertia element mounted in a supporting structure that is revolved at a speed that varies in accordance with the speed of the rotating member, said inertia element being constantly rotated about an axis of spin at right angles to the axis of rotation of the supporting structure and mounted to possess a degree of freedom about an axis of precession at right angles to the axis of spin and at right angles to the axis of rotation of the supporting structure, biasing means for urging said inertia element about its axis of precession, said inertia element being responsive to a gyroscopic couple that acts against the urge of said biasing means and that varies in accordance with the speed of rotation of the supporting structure, a second inertia element mounted in said supporting structure to possess a degree of freedom of motion about the axis of revolution of said supporting structure, said inertia member being responsive to movement about its axis of freedom upon acceleration or deceleration of the supporting structure, an electrical contact member controlled by the spinning inertia member and an electrical contact member controlled by said second named inertia member, and means governed by the cooperation of said contact members for controlling the speed of the rotating member.

8. In a speed regulator, a gyroscope including an inertia element having an axis of spin at an angle to the axis of a rotating shaft whose speed is to be regulated, said gyroscope being driven about the axis of the shaft in accordance with the speed thereof, driving means for the shaft, said gyroscope being so mounted as to have a degree of freedom of motion about a precession axis which is angularly displaced from both the axis of spin and the axis of the rotating shaft, biasing means for resisting precession of the gyroscope about its axis of precession, a second inertia element driven about the axis of the shaft and responsive to the rate of change in the speed thereof, and means actuated jointly by slight movements of the first named inertia element about the precession axis and by slight movements of the second named inertia element about the axis of the rotating shaft for regulating the speed of said driving means.

9. In a speed regulator, gyroscopic means responsive to variations in the speed of a member from a predetermined value, inertia means responsive to the rate of change in the speed of said member, and means actuated jointly by said gyroscopic means and said inertia means for governing the speed of said member.

CLINTON R. HANNA.